July 7, 1959 R. H. VAN HAAGEN 2,893,633
BI-DIRECTIONAL ELECTRIC COUNTING SYSTEM
Filed Oct. 10, 1957 3 Sheets-Sheet 1

INVENTOR.
RICHARD H. VANHAAGEN
BY

July 7, 1959

R. H. VAN HAAGEN 2,893,633

BI-DIRECTIONAL ELECTRIC COUNTING SYSTEM

Filed Oct. 10, 1957

INVENTOR.
Richard H van Haagen
BY

July 7, 1959 R. H. VAN HAAGEN 2,893,633
BI-DIRECTIONAL ELECTRIC COUNTING SYSTEM
Filed Oct. 10, 1957 3 Sheets-Sheet 3

INVENTOR.
RICHARD H VAN HAAGEN
BY 2,893,633

Patented July 7, 1959

2,893,633

BI-DIRECTIONAL ELECTRIC COUNTING SYSTEM

Richard H. Van Haagen, Kirkland, Wash., assignor to the United States of America as represented by the Secretary of the Interior Application October 10, 1957, Serial No. 689,457

5 Claims. (Cl. 235—98)

(Granted under Title 35, U.S. Code (1952), sec. 266)

The invention described herein may be manufactured and used by or for the Government of the United States of America for governmental purposes without payment of any royalties thereon or therefor.

The present invention relates to an electric counting system and contemplates a system for separately recording the passage of units through a given orifice or at a given point in each of two directions. Further, the invention contemplates using detecting devices and a memory device to interpret the outputs thereof.

It will be apparent that the device described has utility in all fields wherein it is advantageous to predicate the management or control thereof upon a traffic distribution study or survey. The system will permit an automatic recording of the number and direction of travel of objects, persons or things past a given point. The mere passage of such items past said point with the consequential disturbance of the surrounding medium, e.g., change in conductivity, in dielectric constant or interruption of energy flow, is sufficient to actuate the respective detectors. Thus no manual control or conscious act is needed on the part of the object, person, or thing to be counted.

The system has a definite utility, e.g., in the management of commercial anadromous or catadromous fisheries to provide statistical information on escapement; to the management of sports fisheries as a source of statistical information on the abundance of stream fish; to the engineer in connection with testing the adequacy of fish passing facilities at a dam; to the fish culturists in providing an adequate census of stock; and, to the commercial fisherman in testing the efficiency of traps.

In salmon management, especially, this system will fill a previously long felt need for measuring the quantity, distribution, timing of escapement and rate of upstream migration of salmon. These needs are now met by visual counting, and by air and ground surveys.

In addition to the enumerated uses, the invention will permit anadromous and catadromous studies where previously no direct counts could be made in any manner, i.e., the study of the relative efficiency of deep orifices, collection systems at dams, and entrances to fish traps. This can now be done by teaching of the invention in the use of two detecting devices located at an opening at a dam, in a counting weir, or in an open stream where adequate guidance past the detector devices is available.

The main object of the present invention is to enumerate and indicate the direction of travel of units at a given point or through an orifice. Another object is to indicate the direction of travel but to reject the false starts of units through an orifice or restricted passageway. A further object is to make allowances in taking the count for uncertain progress and delays within the orifice or restricted passageway and to provide free access from either direction to the point where the count is to be taken.

With these and other objects in view, as will hereinafter more fully appear, reference is now made to the following description taken in connection with the accompanying drawings in which.

Figure 1:
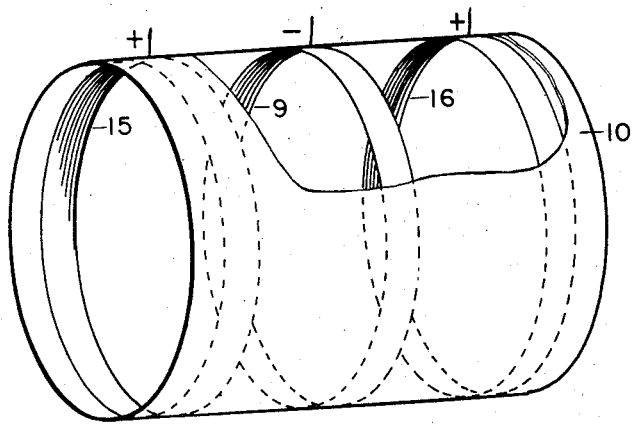
Fig. 1 is a cross sectional view in perspective form of a restricted passageway or orifice of a counting weir.

Referring now to the drawings there is shown in Fig. 1 a cross sectional view of a restricted passageway or orifice of counting weir 10. Incorporated therein are three parallel hoop electrodes 15, 9, and 16. These electrodes from the electrode pairs 15, 9 and 9, 16 which upon energization will have respective electrostatic fields at the midsection of the weir.

In the adaptation of the invention as a fish counting system, an orifice of insulating material approximately ten to twenty inches in diameter and thirty-six inches in length has proven satisfactory for the size of fish encountered in one inland waterway adaptation of the invention. The electrode pairs 15, 9, 9, 16 which are incorporated within the weir may be in the form of rings or bands set in or affixed to the insulating material of the orifice.

Figure 2:
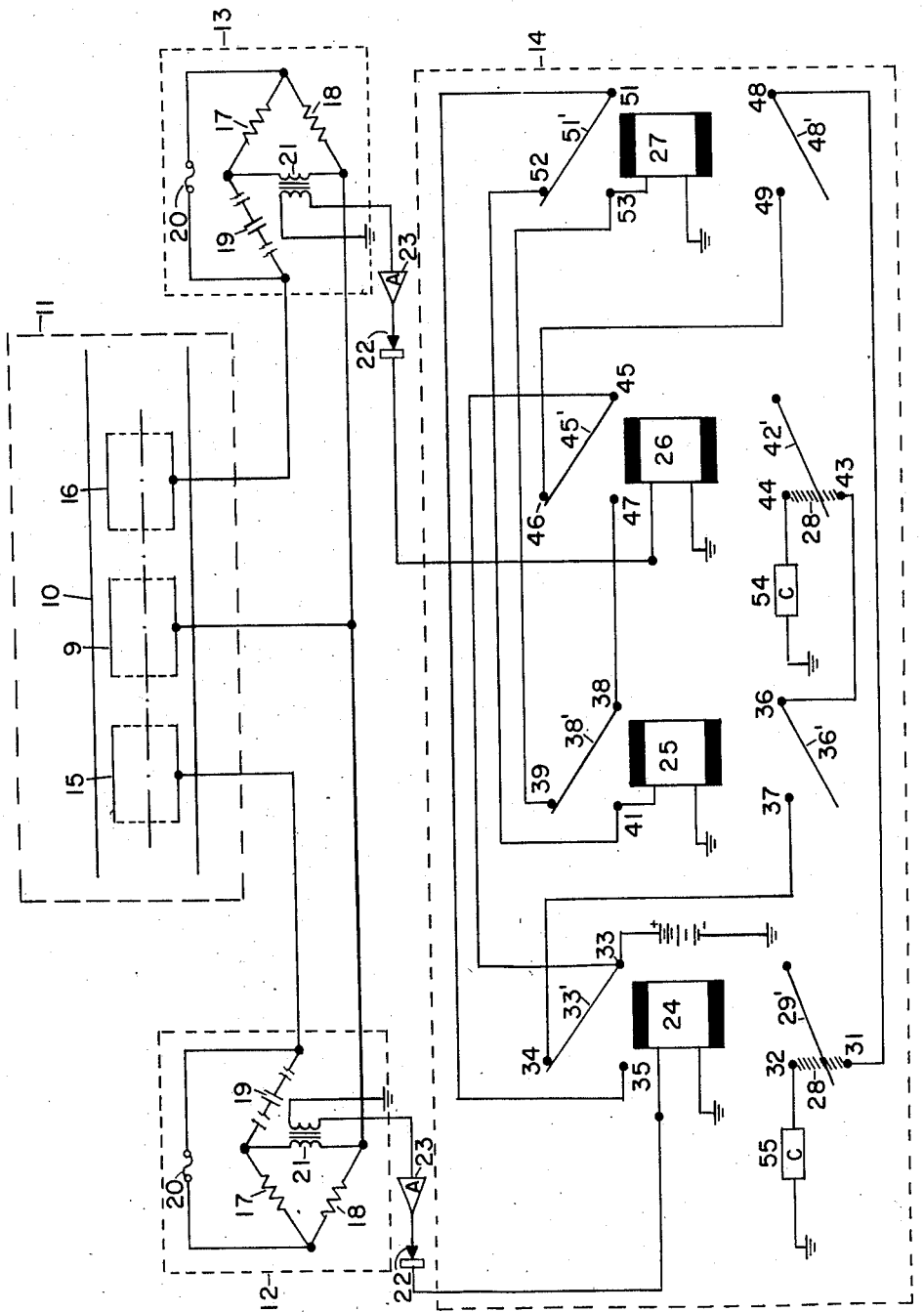
Fig. 2 is a schematic diagram of a circuit embodying one form of the invention.

Fig. 2 is a schematic diagram of a preferred embodiment of a fish counting system. The components of the embodiment have been outlined wherein the counting weir 10 inclusive of the proper circuit connections is designated 11, the two identical bridge detectors of the Wheatstone type are designated 12 and 13 respectively and the memory circuit is designated as 14. The hoop electrode pairs 15, 9 and 9, 16, are each connected as an impedance arm to a respective bridge detector; the connection from the hoop electrode 9 being common to both detectors. The outputs of the bridge detectors are fed into the memory circuit 14 through conventional amplifiers 23 and rectifiers 22. The memory circuit 14 correlates the outputs of the detectors and energizes the proper counter to record the proper directional sequential numbered passage through the weir.

Since the bridge detectors 12 and 13 are identical, it will be understood that the same explanation is applicable to both detectors.

The bridge detector 12 comprises two resistance arms designated by 17 and 18, an impedance arm consisting of the hoop electrode pair 15, 9 situated in the counting weir, and another arm containing either a capacitance 19 as shown in Fig. 2 or an adjustable resistance (not shown).

The capacitance 19 consists of a pair of adjustably spaced electrodes which are to be immersed in the same medium (fresh water or salt water) as that in the counting weir 10 to thereby serve to balance the impedance arms with respect to the dielectric constant of the waterway under study. In order that the electrodes of the capacitatnce 19 may be also immersed in the stream or water-way under study, long leads are required. As a matter of convenience these long leads have not been shown but instead a break on each side of the capacitance is used to designate such a requirement. In this manner capacitance 19 will provide for automatic compensation of changes of conductivity in the said medium. Normally where small changes, if any, in conductivity are to be encountered an adjustable resistor will serve adequately and would be used in place of the capacitance 19.

A coupling transformer 21 is across the two ratio arms of each detector and an alternating current source 20 normally of 50 to 5,000 cycles and of a low potential, i.e., sufficient only to energize the detector components but not high enough to become a disturbing source to the fish, serves each of the two detectors. Preparatory to operation the two detectors are balanced so that there is a minimum or zero output across the coupling transformer 21. A conventional rectifier 22 and amplifier 23 serve their respective functions on the output from the coupling transformer 21 prior to feeding same to the memory device 14.

Figure 3:
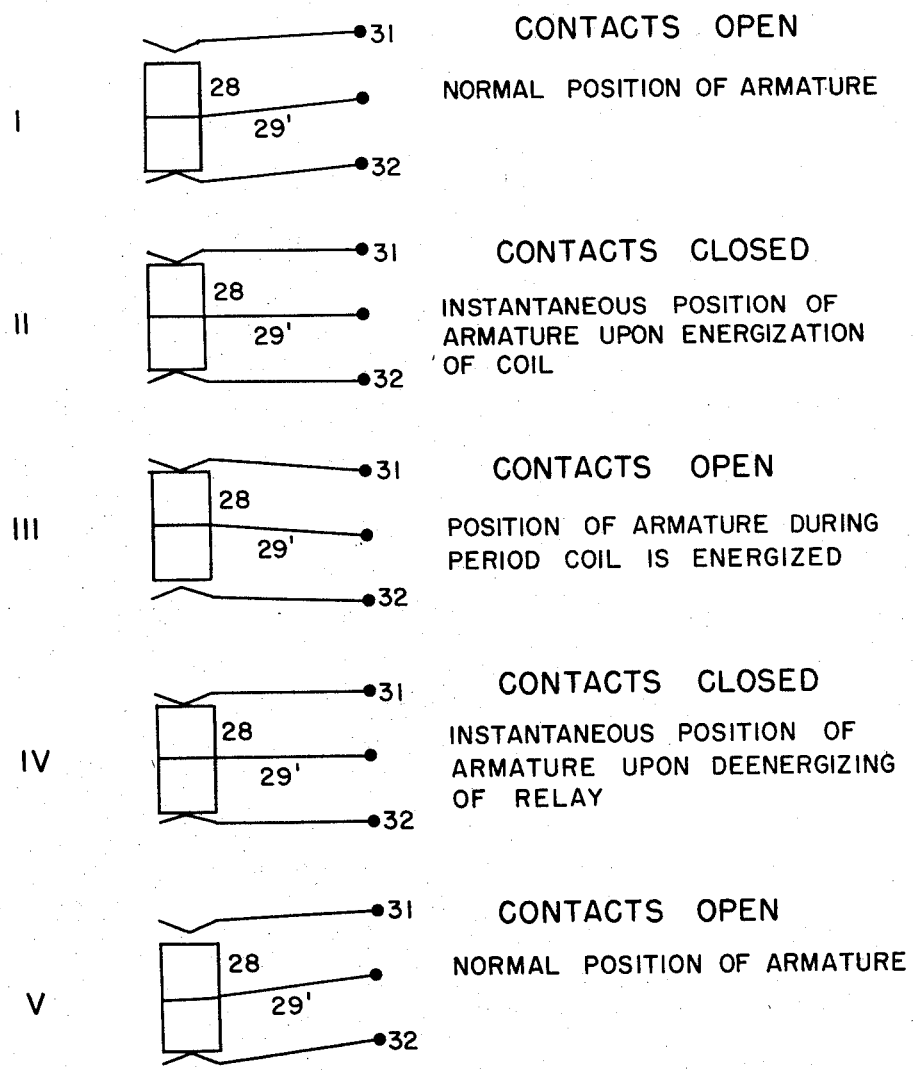
Fig. 3 is a sequential representation of the operation of armature transfer of relays 24 and 26.

The memory device 14 consists of relays 24, 25, 26 and 27. Relays 24 and 26 are of the double-pole-double-throw type with an armature transfer rate of approximately 10 milliseconds. In addition, one of the armatures in each has been designed so that the respective contacts close only during said armature transfer and not when same is in either rest position (Fig. 3). Relays 25 and 27 each provide a single-pole-double-throw and a single-pole-single-throw switch with an armature transfer rate of approximately 30 milliseconds, i.e., the armatures of relays 24 and 26 transfers in about one third the time of the armature transfer rate of relays 25 and 27. The normal positions of all relays prior to energization is as shown in Fig. 2. Included in the memory device 14 are counters 55 and 54 which are of the conventional Mercury or Wizard type.

Fig. 3 details the sequence of operation of one of the armatures of relays 24 and 26. A spring 28 serves to extend the contact surfaces of both sides of the armature 29'. In the normal position (sequence I), one half of spring 28 is compressed against contact 32 with an air gap between the other half of the spring and contact 31. Upon energization of the coil of the respective relay 24 or 26, the armature transfers and releases the compressed half of the spring 28. Through the mid-portion of the armature transfer the now non-compressed spring 28 connects contacts 31, 32 and closes said circuit (sequence II). At the completion of the armature transfer (sequence III), i.e., continued energization of the respective coil, the other half of spring 28 is compressed against contact 31 and an air gap exists between the spring and contact 32. De-energization of the respective relay returns the armature to the normal position, the consequential effect of which is shown in sequences IV and V of Fig. 3.

The operation of the bi-directional electric counting system is as follows:

A fish entering the orifice of the counting weir 11, Fig. 2, in the direction from left to right, will influence the electrostatic field of electrode pair 15, 9 of bridge detector 12 and unbalance that circuit. The unbalance causes an alternating current signal to be impressed on the coupling transformer 21. This signal is then amplified and rectified by the respective components 23 and 22 and fed to the coil of relay 24.

The energization of said coil actuates armatures 29' and 33'. Armature 29' momentarily closes contact 31, 32 (sequence I, II, and III, Fig. 3) which does not affect the circuit as contacts 48, 49 are open. Armature 33' opens contacts 33, 34 and closes contacts 33, 35, thus completing the circuit 33, 35, 51, 52, 41 and thereby energizes the coil of relay 25.

The armatures 36' and 38' of relay 25 upon operation, respectively closes contacts 36, 37 and 38, 41 and the armature 38 in addition opens contacts 38, 39. The closing of contacts 36, 37 and 38, 41 have no effect on the circuit since contacts 43, 44 and 34, 33 and 47, 46 are open respectively.

Should the fish withdraw from the counting weir on the same path as the entry, the bridge detector 12 returns to the balanced state and the relays 24 and 25 return to the normal positions without operating either counter.

However, should the passage progress through the weir to the mid-point thereof, the fish must pass through the common electrode 9 and into the electrostatic field of electrode pairs 9, 16 thus disturbing the electrostatic fields of both hoop electrode pairs. The consequential effect is to also unbalance the bridge detector 13 which in the aforementioned manner will feed a rectified and amplified signal to the coil of relay 26.

The energization of said relay actuates armatures 42' and 45'. Armature 42' momentarily closes contact 43, 44 (sequences I, II, and III, Fig. 3) which does not affect the circuit due to the opening existing between contacts 33, 34 (relay 24 and relay 25 remains energized). Armature 45' closes contacts 45, 47 thereby completing a holding circuit 33 through 45, 47, 38, 41 and relay 25 to ground for the continued energization of relay 25 after relay 24 becomes de-energized.

Again, should the fish withdraw from the counting weir on the same path as the entry, the affected circuits will return to the normal state without actuating either counter.

Continued progress in the left to right direction will remove the fish from the influence of the electrostatic field of the electrode pair 15, 9 and be entirely within the electrostatic field of electrode 9, 16. Thereupon the bridge detector 12 returns to the normal balanced state and relay 24 is de-energized.

Consequently, armatures 29' and 33' return to the normal position. Armature 29' momentarily closes contacts 31, 32 (sequences III, IV and V, Fig. 3) which does not affect the circuit as contacts 48, 49 are open. Armature 33' opens contacts 33, 35 and closes contacts 33, 34. The opening of contacts 33, 35 has no effect upon the circuit due to the aforementioned holding circuit 33 through 45, 47, 38, 41 and relay 25 to ground. The closing of contacts 33, 34 has no effect upon the circuit since contacts 43, 44 are open (sequences I, II, and III, Fig. 3).

If the passage through the counting weir 11 is completed and the fish moves out of the electrostatic field of electrode pair 9, 16, the coil of relay 26 is de-energized.

The consequence thereof is to transfer armatures 45' and 42' to the normal position. Armature 45' opens contacts 45, 47 and closes contacts 45, 46. The closure of contacts 45, 46 does not affect the circuit as contacts 49, 48 are open. The opening of contacts 45, 47 opens the holding circuit 33 through 45, 47, 38, 41 and relay 25 to ground and in turn relay 25 is de-energized. Armature 42' of relay 26 momentarily closes contact 43, 44 (sequences III, IV, and V, Fig. 3).

Here, the difference of armature transfer rate of relays 25 and 26 as aforementioned is to be noted.

The de-energized relay 25 (consequence of breaking the holding circuit 33 through 45, 47, 38, 41, and relay 25 to ground) actuates armatures 36' and 38'. Armature 36' opens contacts 36, 37 but the difference in armature transfer rates of relays 25 and 26 permits, due to the momentary closing of contacts 43, 44, the flow of energy in the circuit 33, 34, 37, 36, 43, 44 leading to the sequential counter 54, before contacts 36, 37 actually open. Thereby, an indication is made on the counter of the completed passage and as only counter 54 was actuated by the left to right passage, the direction of travel through the weir is established by the recording on that counter only.

Operation of the bi-direction electric counting system in the reverse direction, i. e., from right to left, is similar to that described with the exception that relay 27 instead of relay 25 serves as holding relay and counter 55 instead of 54 will indicate the completed passage.

The system is thus applicable to situations in counting where the passage at a given point or through an orifice can be represented as:

a. *Initial state*—no detection of an object at the location.

b. *Secondary state*—detection of an object from one direction of entry.

c. *Tertiary state*—detection of an object at the mid-portion of the system, i.e., at the overlapping fields of influence.

d. *Fourth state*—detection of object upon exit.

*e. Fifth state*—indication of complete passage and return to initial state.

Many forms of detection may be used so long as signals representing the above situations are furnished to the memory device herein described.

It is apparent that the above memory device is relatively inexpensive, requires little power and operates rapidly enough to enumerate the quickest passage through the instrumental orifice. It correctly identifies the direction of passage, and allows for false starts, uncertain progress and long time delays in the orifice.

Power can be obtained from batteries or other suitable sources. Unit construction may be employed for ease of maintenance. Further, the output of the memory device may be adapted for central telemetering.

Obviously many modifications and variations of the present invention are possible in the light of the above teaching. It is therefore to be understood, that within the scope of the appended claims, the invention may be practiced otherwise than as specifically described.

What is claimed is:

1. In a bi-directional electric counting system adapted to a counting weir for the study of fish, an insulated orifice having tapered approaches from either direction with extended flared end sections as the only fish passage at a given point for both upstream and downstream migration; two electrode pairs aligned and affixed within the orifice in such manner that cylindrically each lies upon the longitudinal axis of the orifice and so located as to permit the respective electrostatic fields to exist at the mid-point of the orifice; two similar impedance bridge detectors provided with automatic compensation for change of conductivity within the orifice and each associated with a different electrode pair to be thereby electrically unbalanced as a consequence of any entry into the orifice; a four relay memory system selectively responsive to the amplified and rectified output of the impedance bridge detectors consisting of, two detector relays of two armatures each of the double-throw type and one of which closing the associated circuitry only momentarily immediately upon energization and again immediately upon de-energization of the respective relay coil, two holding relays of two armatures each of the double-throw and single-throw type respectively with the armature transfer rate of either several times the duration of the armature transfer rate of either detector relay armatures, the detector and holding relays arranged in a bi-lateral symmetrical circuit for correlating the respective detector outputs wherein the two detector relays and one holding relay are actuated by a complete passage through the orifice in one direction and the two detector relays and the other holding relay actuated by said passage in the opposite direction; and two electric registering counters each actuated when the related holding relay of the four relay memory system has operated so that counts of completed passages through the orifice in one direction are maintained on one and completed passages in the opposite direction are maintained on the other.

2. A bi-directional electric counting system comprising a restricted insulated passage, a plurality of electrode pairs affixed within the passage and in cylindrical aligned arrangement coinciding with the longitudinal axis of the passage so that consecutive electrode pairs have a common electrode, a plurality of detectors each incorporating one of said electrode pairs as the actuating element, a relay memory system to correlate the outputs of the detectors consisting of a plurality of detector relays each having two double-throw armatures with one thereof to close the respective contacts momentarily upon armature transfer, a plurality of holding relays each having two armatures of the double-throw and single-throw type respectively with an armature transfer rate of both relatively slower than that of the detector relays, the detector and holding relays arranged in bi-lateral circuit to establish the direction of the enumeration intelligence, and two electric counters to indicate the number of completed passages from either of two directions and related to the relay memory system in such manner that one counter records only completed passages from one direction and the other counter records passages from the other.

3. In a fish counting system, a restricted insulated orifice through which fish to be counted are funneled; two electrode pairs having each a common electrode within and in sequence along the longitudinal axis of the orifice within the proximity of the mid-portion of the orifice; two impedance bridge detectors of similar elements including one of the electrode pairs in each; a four relay memory system consisting of two similar detector relays of two armatures each, one of which is to close the associated circuit momentarily upon said armature transfer and each of which is energized by a separate amplified and rectified detector output, two similar holding relays of two armatures each selectively actuated as determined by the direction of entry to the orifice and with an armature transfer rate relatively slower than that of the detector relays; and two electric counters in turn each actuated only when the related holding relay has been energized by the given direction of entry into the orifice, the counters enumerating respectively only completed transversals in a given direction.

4. A bi-directional fish counting system comprising an insulated orifice with flared end sections through which the fish to be counted must pass; a plurality of at least two electrode pairs having each a common electrode in spaced sequential cylindrical alignment coincident with the longitudinal axis of the orifice and contained therein; a plurality of detector means associated with respective electrode pairs for detection of entry into the orifice from either direction; a system or relays in bilateral symmetrical circuitry to correlate the output of the detector means consisting of a plurality of detector relays with one armature of each to close only momentarily the associated circuitry through the transfer thereof and a plurality of holding relays with an armature transfer rate of several times the duration of the detector relays armature transfer rate; and, two electric recording counters actuated by the relay system so that counts of completed passages in one direction through the orifice are maintained on one counter and counts of completed passages in the opposite direction are maintained on the other counter.

5. A bi-direction electric counting system comprising a restricted insulated passage through which the objects to be counted must pass; a plurality of electrode pairs in sequential central axis alignment along the longitudinal axis of the passage and having a common electrode between each two pair, a plurality of detector means incorporating the electrode pairs as elements thereof for bi-directional entry detection to the passage; a relay system coupled to the detector means output and consisting of a plurality of similar detector relays wherein there is an armature to close the associated circuitry momentarily immediately upon energization and again immediately upon de-energization thereof, a plurality of similar holding relay means with armature transfer rates relatively slower than those of the detector relay means; and two electric recording counters; the respective relay means arranged in bi-lateral symmetry to correlate the detector output and actuate the specific electric counter means to enumerate the traffic through the restricted passage in either of two directions.

References Cited in the file of this patent

UNITED STATES PATENTS

| | | |
|---|---|---|
| 2,152,296 | Weis et al. | Mar. 28, 1939 |
| 2,474,156 | Namenyi-Katz | Jan. 21, 1949 |
| 2,555,977 | Kline | June 5, 1951 |

FOREIGN PATENTS

| | | |
|---|---|---|
| 373,649 | Great Britain | May 17, 1932 |